United States Patent Office 3,303,852
Patented Feb. 14, 1967

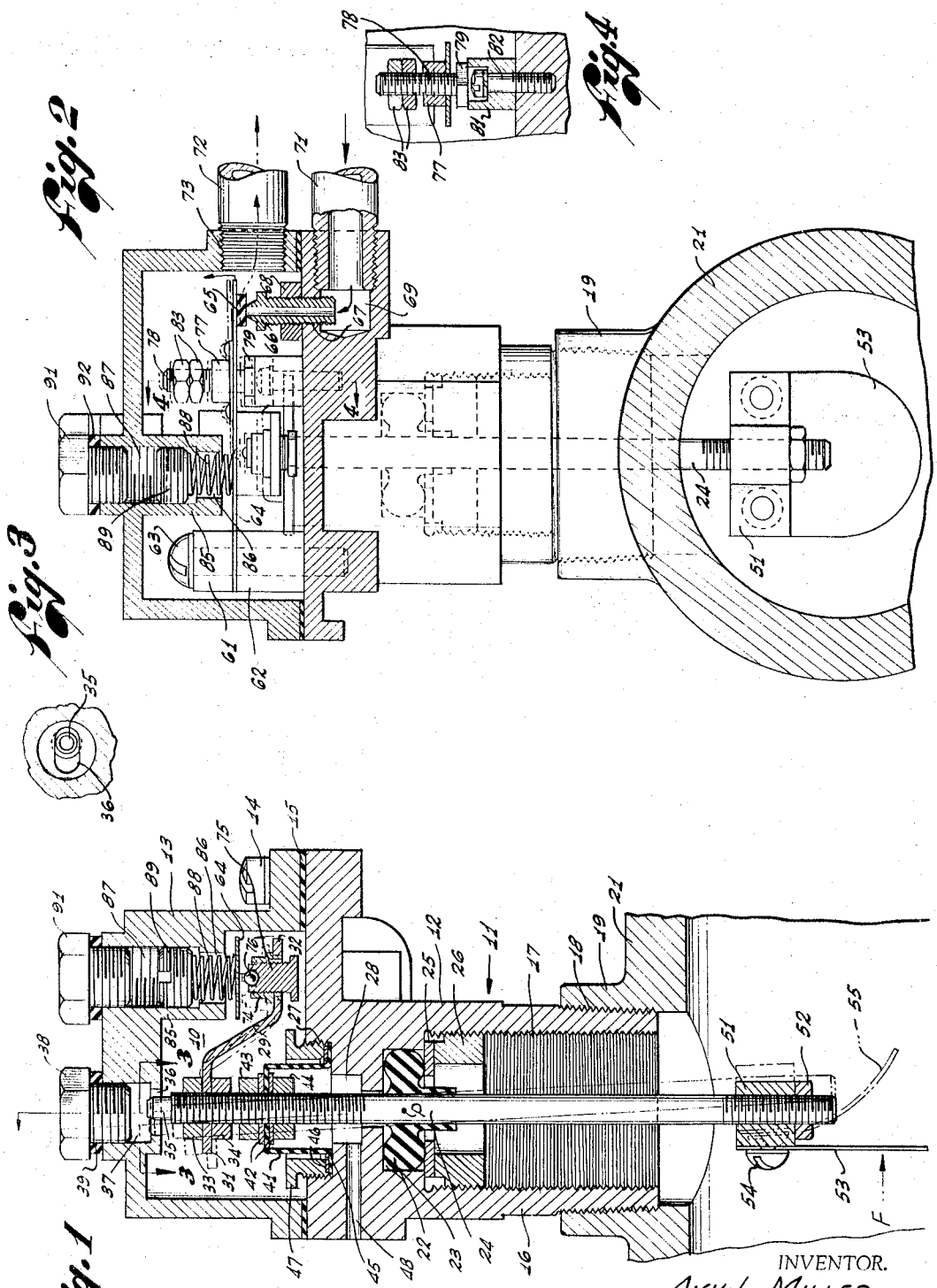

3,303,852
AUTOMATIC ACTUATED FLOW
CONTROLLED VALVE
Avy L. Miller, 13246 Saticoy St.,
North Hollywood, Calif. 91605
Filed Feb. 6, 1962, Ser. No. 171,439
11 Claims. (Cl. 137—87)

This invention relates generally to valves for controlling fluid flow, and more particularly to fluid flow controlling valves operating automatically in response to an exterior condition.

The specific embodiment of the invention selected for illustration and description herein is a fluid flow controlling valve automatically operable in response to the flow of another fluid. An application of the specific embodiment selected for illustration and description is in a continuous flow water heater where the valve controls the flow of fuel to the burner for the heater, and in which the position of the valve is controlled in accordance with the flow of fluid to be heated through the heater. In a continuous flow water heater the valve may operate to turn the burner on and off in response to the flow or nonflow of water through the heater, or it may operate as a safety switch to cut off the flow of fuel to the burner, which is primarily temperature controlled, in the event of a stoppage of flow of water through the heater. The specific embodiment of the valve selected for illustration and description herein and its specific application are to be considered exemplary only and not restrictive of the scope of the invention.

It is, therefore, an object of the present invention to provide an improved form of fluid flow controlling valve having desirable features of simplicity, economy and reliability.

Another object of this invention is the provision of an improved form of fluid flow controlling valve having an improved double seal arrangement for the actuator for the valve.

Another object of this invention is the provision in a fluid flow controlling valve of an improved simple and flexible seal for the valve actuator capable of withstanding a relatively high pressure.

A further object of this invention is the provision of an improved fluid flow controlling valve automatically actuated in response to the flow of another fluid to which the valve is thereby made responsive.

A still further object of this invention is the provision of an improved automatic fluid controlling valve operating with a snap action upon relatively small movement of its actuator.

Yet another object of this invention is the provision of an improved fluid controlling valve automatically operable in response to an external condition which is adjustable to vary the value of the condition at which it operates and in which increase in adjustment is in the direction to maintain the valve closed.

These and other objects and features of this invention will be readily apparent to those skilled in the art from the following specification and the appended drawing, in which:

FIGURE 1 is a vertical sectional view through the valve according to the present invention;

FIGURE 2 is a vertical sectional view taken at right angles to the section of FIGURE 1;

FIGURE 3 is a detail sectional view at line 3—3 of FIGURE 1; and

FIGURE 4 is a detail sectional view at the line 4—4 of FIGURE 2.

The valve according to the present invention, shown generally at 11, is made up of a body section 12 and an upper inverted-cup section 13 sealably attached to the body section 11 by studs 14 and a sealing gasket 15 to define a valve chamber 10. The body section 12 has a cylindrical lower portion 16 threaded interiorly at 17 and exteriorly at 18. The threads 18 are received in and receive complementary threads in a hub 19 defining an opening into a fluid conduit 21. Above the threads 17 is a recess 22 within which is disposed a flexible sealing ring 23 of, for example, rubber or plastic, which is vulcanized or molded upon an actuator rod 24 in sealing relation. An annular retainer plate 25 partially closes the lower end of the recess 22 and is held in place by an annular threaded plug 26 coacting with the interior threads 17 of the tubular portion 16 of the body section 12. The flexible ring 23 is compressed between the end surface defining the recess 22 and the upper surface of the annular plate 25 to form a seal. The upper surface of the body section 12 is provided with a threaded recess 27 and the recesses 22 and 27 are interconnected by a multi-diameter passage 28 through which the actuator rod 24 extends.

Upon the upper end of the rod 24 is mounted a valve actuating arm 29 having offset parallel end portions 31 and 32. The end portion 31 of the arm 29 is mounted on the upper end of the actuator rod 24 between nuts 33 and 34 threaded on the rod. At its upper extreme end the rod 24 is provided with a guiding tip 35 received within a slot 36 in the upper wall of the inverted-cup section 13 so as to guide the rod 24 for oscillating movement in the plane of FIGURE 1 about an axis of rotation transverse to the rod and passing through the intersection of the axis of the rod and the midplane of the sealing ring 23, and indicated in the drawing at P. Above the slot 36 is an access opening 37 sealed by a capscrew 38 and a washer 39.

A second seal is provided about the actuator rod 24 by the inverted-cupshaped, flexible sealing member 41 having its base provided with an opening therethrough receiving the rod 24 and sealed between a pair of washers 42 held between nuts 43 and 44 threaded on the rod. The cupshaped sealing member 41 is provided with an outwardly extending flange 45 which is sealably held against the bottom surface of the recess 27 by an annular washer 46 and an annular plug 47 threaded in the recess 27. A vent 48 communicates with the passage 28 to lead to atmosphere any leakage through the seals about the actuator rod 24, the vent 48 leading from between these seals.

Upon the lower end of the actuator rod 24 is threaded a paddle support 51, locked in position thereon by a locking nut 52. Upon the support 51 is mounted a paddle 53 of relatively light spring material by means of studs 54. The paddle 53 is disposed in the conduit 21 transversely of the direction of flow, so as to move the actuator rod 24 in a counterclockwise direction in response to flow of fluid through the conduit in the direction of the arrow F, the actuator rod rotating about the axis P. The paddle 53 is made sufficiently light so that at the higher rates of flow it will flex into the position shown in broken lines at 55, thereby lowering the pressure drop in the fluid flowing thereby.

Upon the upper surface of the body section 12 within the chamber 10 a pair of tubular posts 61 and 62 are mounted in superposed relation by a stud 63 threaded into the body section. Between the tubular posts 61 and 62 is mounted one end of a leaf spring valve arm 64. The opposite end of the valve arm 64 carries a sealing disc 65 cooperating with the end of a stationary valve element 66 to close off or seal the valve. The valve element 66 is threaded in an opening 67 in the body section 12 and adjustably locked in position by a locking nut 68 threaded on itself. The opening 67 communicates with a horizontal inlet opening 69 into which is threaded an inlet conduit 71. An outlet conduit 72 is threaded in an opening 73 leading into the chamber 10 through the inverted-cup section 13.

Upon the end 32 of the actuating arm 29 is mounted an interiorly threaded tubular support 74, as by brazing or riveting, and in this support is adjustably threaded a seat 75 for a bearing ball 76 which provides for substantially frictionless engagement with the under surface of the leaf spring valve arm 64.

An interiorly threaded tubular hub 77 is mounted on the upper surface of the valve arm 64 and in the hub 77 is threaded a stud 78 having a head 79 serving as a moving armature cooperating with a permanent magnet 81. The magnet 81 is mounted on the upper surface of a body section 12 by means of a stud 82, as shown in FIGURE 4. A pair of nuts 83 are jammed together on the stud 78 to provide a manipulating knob for rotating the stud and adjusting its position within the hub 77. The inverted-cup section 13 is provided with an interior boss 85 above the valve arm 64 through which extends an opening 86 having an upper countersunk threaded portion 87. In the opening 86 is disposed a biasing compression spring 88 bearing against the upper surface of the spring leaf valve arm 64 and having its bias adjustable by means of an adjustable stop plug 89 threaded in the portion 87. The top of the opening 86 is sealed by means of a capscrew 91 and a sealing washer 92.

In the application of the specific embodiment of the invention shown herein, the conduit 21 is connected to have a fluid, such as water, to be heated flow therethrough. The valve may control a fluid fuel passing from the inlet 71, through the valve to the outlet 72, and thence either directly to a burner to heat the fluid passing through the conduit 21, or the gas from the outlet 72 may pass to a controlling diaphragm for a main valve in the heat supply system. Again, instead of a direct control in response to fluid flow, the valve 11 may function as a safety valve in the manner described in my copending application, Serial No. 134,465, filed August 28, 1961, for Continuous Flow Fluid Heater Control, now Patent No. 3,118,600, granted January 24, 1964.

In the positions illustrated in full lines in the drawing, no fluid is flowing through the conduit 21, and the valve is in closed position. The spring leaf arm 64 is biased by its own inherent bias to close the valve by pressing the sealing disc 65 against the end of the valve element 66. Thus, even if the stop plug 89 is adjusted so that there is no tension on the spring 88, the valve will still be normally maintained closed under its own inherent bias. By adjustment of the plug 89 the tension on the arm 64, and hence the point at which the valve is opened, may be varied; and it will be noted in the construction herein shown, that increasing the stress on the spring 88 will not open the valve but will always tend to maintain the valve closed.

When the fluid flows through the conduit 21, the paddle 53 will be moved thereby in the direction of the arrow F so as to rotate the actuator rod 24 counterclockwise about the axis P. In this rotative movement the rod 24 is guided for movement in the plane of FIGURE 1 by the engagement of its tip 35 in the guide slot 36. In this rotation of the actuator rod 24 the actuating arm 29 is moved thereby into the dotted line position shown in FIGURE 1. In this movement the ball 76 engages the under surface of the spring leaf valve arm 64 and moves it upwardly against its inherent bias and the bias of the spring 88. The valve arm 64 is, however, restrained against initial movement by the engagement of the armature head 79 with the permanent magnet 81, which serves to hold the latch closed until a substantial tension has been built up in the arm 64. When this tension becomes great enough, it will break the magnetic attachment between the armature 79 and the magnet 81 and the valve arm will snap quickly upwardly to open the valve by moving the disc 65 away from the valve element 66 with a snap action. This opening of the valve permits gas or other fluid to flow from the inlet 71 through the opening 69 and the valve element 66 into the chamber 10, from whence it flows through the opening 73 to the outlet conduit 72. The counterclockwise rotation of the actuator rod 24 is easily effected about the axis P due to the resiliency and/or flexibility of the sealing ring 23, and the engagement of the arm 29 with the valve arm is substantially frictionless through the ball 76. The molded or vulcanized attachment of the sealing ring 23 to the actuator rod 24 and its compression retention in the recess 22 enables this seal to withstand relatively high pressures of the order of boiler pressures having a value of three hundred pounds per square inch or more.

If the flow of fluid through the conduit 21 is sufficiently great, the paddle 53 will not only be moved bodily in a counterclockwise direction about the pivot P, but will also itself flex into the position shown at 55 in FIGURE 1 to lower the pressure drop in the fluid flowing thereby. If a leakage of this relatively high pressure past the sealing ring 23 should occur, it will not enter the valve chamber 10 since it will be vented to atmosphere through the vent 48, the chamber 10 remaining sealed by the cup-shaped sealing element 41.

If the flow of fluid through the conduit 21 decreases to a value determined by the adjustment of the stop plug 89, the spring 88 and the inherent bias of the valve arm 64 will move the arm toward valve closed position and the sealing disc 65 will approach the valve element 66. In the last portion of this movement the magnetic attraction of the permanent magnet 81 will pull the armature 79 into engagement therewith to effect final sealing of the valve with a snap action and prevent fluttering or an indefinite positioning of the sealing disc adjacent the valve element. By this means the operation of the valve is such that it will always be positively open or positively shut.

There is thus seen to be provided a flow controlling valve of positive, reliable operation in which the positions of the parts and the operating point for the valve may be readily adjusted to secure optimum operating characteristics. The valve also provides for positive, snap action on-off operation, and has a double seal for the actuator provided with a relief vent between its elements to the atmosphere. One of the valve actuator seals is effective against relatively high pressure and the valve is operated by a relatively short movement of the actuator rod which does not impair the seals thereabout. While the valve finds ready application as a flow valve, it is clearly susceptible to other automatic or remote operations; and while a certain preferred embodiment and an application thereof have been specifically shown and described, it is understood that the invention is not limited thereto, as many variations will be apparent to those skilled in the art, and the invention is to be given its broadest interpretation within the terms of the following claims.

I claim:

1. A fluid flow controlling valve comprising: an enclosure; a valve arm in said enclosure; valve opening and closing means moved by said arm; means biasing said arm to one control position; an actuator extending through the enclosure from the interior to the exterior of said valve and connected interiorly of the valve to move said valve arm to another control position; sealing means about said actuator providing a seal thereabout as it passes from the interior to the exterior of said valve, said sealing means being flexible and providing a pivotal axis at said passage point solely by its flexure about which said actuator rotates to effect movement of the valve arm from said one control position to the other control position; a permanent magnet member and a magnetic member cooperating therewith; means mounting one of said members on a fixed part; and means mounting the other of said members on said valve arm so as to effect movement of said valve arm in opposite directions with a snap action.

2. A fluid flow controlling valve comprising: an enclosure; a valve arm in said enclosure; valve opening and closing means moved by said arm; means biasing said arm to one control position; an actuator extending through the enclosure from the interior to the exterior of said valve and connected interiorly of the valve to move said valve arm to another control position; sealing means about said actuator providing a seal thereabout as it passes from the interior to the exterior of said valve, said sealing means being flexible and providing a pivotal axis at said passage point solely by its flexure about which said actuator rotates to effect movement of the valve arm from said one control position to the other control position; a permanent magnet member and a magnetic member cooperating therewith; means mounting one of said members on a fixed part; means mounting the other of said members on said valve arm so as to effect movement of said valve arm in opposite directions with a snap action, said valve arm being a leaf spring inherently biased to said one control position; a sealing disc carried by said valve arm; and a stationary valve element cooperating with and closed by said sealing disc in said one control position to close the valve.

3. A fluid flow controlling valve comprising: an enclosure; a valve arm in said enclosure; valve opening and closing means moved by said arm; means biasing said arm to one control position; means engageable with said arm to move it to another control position; an actuator extending through the enclosure from the interior to the exterior of said valve and connected interiorly of the valve to move said means engageable with the valve arm; and sealing means about said actuator providing a seal thereabout as it passes from the interior to the exterior of said valve, said sealing means being flexible and providing a pivotal axis at said passage point solely by its flexure about which said actuator rotates to effect movement of the valve arm from said one control position to the other control position, said means engageable with said valve arm comprising an arm carried by said actuator and a ball supported on said arm with a substantially point contact and engaging the surface of the valve arm to minimize friction in relative movement therebetween while engaged.

4. A fluid flow controlling valve comprising: an enclosure defining a valve chamber; means defining an inlet into said chamber; a valve element in said chamber having an opening therethrough communicating with said inlet; an inherently resilient valve arm in said chamber; means mounting one end of said valve arm in fixed relation; a sealing disc mounted adjacent the free end of said valve arm in position to close the opening in said valve element; an actuator rod extending through said enclosure into said chamber; an actuating arm mounted on said actuator rod within the chamber and having means adjacent its free end engaging said resilient valve arm to effect movement thereof out of valve closing position; and sealing means connected to and mounting said actuator rod on said enclosure in sealing relation with respect to said chamber, said sealing means being flexible to provide for operation of the actuator rod therethrough from the exterior of the enclosure.

5. A fluid flow controlling valve comprising: an enclosure defining a valve chamber; means defining an inlet into said chamber; a valve element in said chamber having an opening therethrough communicating with said inlet; an inherently resilient valve arm in said chamber; means mounting one end of said valve arm in fixed relation; a sealing disc mounted adjacent the free end of said valve arm in position to close the opening in said valve element; an actuator rod extending through said enclosure into said chamber; an actuating arm mounted on said actuator rod within the chamber and having means adjacent its free end engaging said resilient valve arm to effect movement thereof out of valve closing position; and sealing means connected to and mounting said actuator rod on said enclosure in sealing relation with respect to said chamber, said sealing means including a flexible sealing ring integrally bonded to the actuator rod and compression sealed to the enclosure and providing for rotative movement of the actuator rod about an axis transverse to the rod at the intersection of its longitudinal axis and the plane of the sealing ring solely by flexing of the ring and without relative movement between surfaces connected to the actuator rod and sealing ring.

6. A fluid flow controlling valve comprising: an enclosure defining a valve chamber; means defining an inlet into said chamber; a valve element in said chamber having an opening therethrough communicating with said inlet; an inherently resilient valve arm in said chamber; means mounting one end of said valve arm in fixed relation; a sealing disc mounted adjacent the free end of said valve arm in position to close the opening in said valve element; an actuator rod extending through said enclosure into said chamber; an actuating arm mounted on said actuator rod within the chamber and having means adjacent its free end engaging said resilient valve arm to effect movement thereof out of valve closing position; sealing means connected to and mounting said actuator rod on said enclosure in sealing relation with respect to said chamber, said sealing means including a flexible sealing ring integrally bonded to the actuator rod and compression sealed to the enclosure and providing for rotative movement of the actuator rod about an axis transverse to the rod at the intersection of its longitudinal axis and the plane of the sealing ring solely by flexing of the ring and without relative movement between surfaces connected to the actuator rod and sealing ring; an operating paddle mounted on said actuator rod exteriorly of said enclosure; and means mounting said valve adjacent to a fluid conduit with said paddle positioned in the fluid to be moved in response to flow thereof.

7. A fluid flow controlling valve comprising: an enclosure defining a valve chamber; means defining an inlet into said chamber; a valve element in said chamber having an opening therethrough communicating with said inlet; a valve arm in said chamber biased toward closed position; sealing means mounted on said valve arm and closing the opening in said valve element in the closed position of the arm; an actuator rod extending through said enclosure into said chamber; an actuating arm mounted on said actuator rod within the chamber and having means adjacent its free end engaging said valve arm to effect movement thereof out of valve closing position; and sealing means connected to and mounting said actuator rod on said enclosure in sealing relation with respect to said chamber, said sealing means including a single flexible sealing ring integrally bonded to the actuator rod and compression sealed to the enclosure and providing for rotative movement of the actuator rod about an axis transverse to the rod at the intersection of its longitudinal axis and the plane of the sealing ring solely by flexing of the ring and without relative movement between surfaces connected to the actuator rod and sealing ring.

8. A fluid flow controlling valve comprising: an enclosure defining a valve chamber; means defining an inlet into said chamber; a valve element in said chamber having an opening therethrough communicating with said inlet; a leaf spring valve arm in said chamber having an inherent bias toward closed position; means mounting one end of said valve arm in fixed relation; sealing means mounted adjacent to the free end of said valve arm in position to close the opening in said valve element to close the valve; adjustable means for further biasing said valve arm toward closed position to determine the operating point for the valve; an actuator rod extending through said enclosure into said chamber; an actuating arm mounted on said actuator rod within the chamber and having means adjacent its free end engaging said valve arm to effect movement thereof out of valve closing position; and sealing means connected to and mounting said actuator rod on said enclosure in sealing relation with respect to said chamber, said sealing means including a flexible sealing ring integrally bonded to the actuator rod and compression sealed to the enclosure and providing for rotative movement of the actuator rod about an axis transverse to the rod at the intersection of its longitudinal axis and the plane of the sealing ring solely by flexing of the ring and without relative movement between surfaces connected to the actuator rod and sealing ring.

9. A fluid flow controlling valve comprising: an enclosure defining a valve chamber; means defining an inlet into said chamber; a valve element in said chamber having an opening therethrough communicating with said inlet; a leaf spring valve arm in said chamber having an inherent bias toward closed position; means mounting one end of said valve arm in fixed relation; sealing means mounted adjacent to the free end of said valve arm in position to close the opening in said valve element to close the valve; adjustable means for further biasing said valve arm toward closed position to determine the operating point for the valve; an actuator rod extending through said enclosure into said chamber; an actuating arm mounted on said actuator rod within the chamber and having means adjacent its free end engaging said valve arm to effect movement thereof out of valve closing position; a permanent magnet member and a magnetic member cooperating therewith within said valve chamber; means fixedly mounting one of said members; means mounting the other of said members on said valve arm so as to effect snap action of the valve arm into and out of closing position; and sealing means connected to and mounting said actuator rod on said enclosure in sealing relation with respect to said chamber, said sealing means including a flexible sealing ring integrally bonded to the actuator rod and compression sealed to the enclosure and providing for rotative movement of the actuator rod about an axis transverse to the rod at the intersection of its longitudinal axis and the plane of the sealing ring solely by flexing of the ring and without relative movement between surfaces connected to the actuator rod and sealing ring.

10. A fluid flow controlling valve comprising: an enclosure defining a valve chamber; means defining an inlet into said chamber; a valve element in said chamber having an opening therethrough communicating with said inlet; an inherently resilient valve arm in said chamber; means mounting one end of said valve arm in fixed relation; a sealing disc mounted adjacent the free end of said valve arm in position to close the opening in said valve element; an actuator rod extending through an entrance opening in said enclosure into said chamber; an actuating arm mounted on said actuator rod within the chamber and having means adjacent its free end engaging said resilient valve arm to effect movement thereof out of valve closing position; a first sealing means connected to and mounting said actuator rod on said enclosure in sealing relation with respect to said opening, said sealing means including a flexible sealing ring integrally bonded to the actuator rod and compression sealed to the enclosure and providing for rotative movement of the actuator rod about an axis transverse to the rod at the intersection of its longitudinal axis and the plane of the sealing ring solely by flexing of the ring and without relative movement between surfaces connected to the actuator rod and sealing ring; a second sealing means about said actuator rod for sealing said entrance opening interiorly of said first sealing means, said second sealing means being independent of said first sealing means and of said rotative axis; means for mounting said valve enclosure to expose the exterior of said first sealing means to a pressure other than atmospheric; and a vent to atmosphere leading to said entrance opening between said sealing means.

11. A fluid flow controlling valve comprising: an enclosure defining a valve chamber; means defining an inlet into said chamber; a valve element in said chamber having an opening therethrough communicating with said inlet; an inherently resilient valve arm in said chamber biased toward valve closing position; means mounting one end of said valve arm in fixed relation; a sealing disc mounted adjacent the free end of said valve arm in position to close the opening in said valve element; an actuator rod extending through an entrance opening in said enclosure into said chamber; an actuating arm mounted on said actuator rod within the chamber and having means adjacent its free end engaging said resilient valve arm to effect movement thereof out of valve closing position; a first sealing means connected to and mounting said actuator rod on said enclosure in sealing relation with respect to said entrance opening, said sealing means including a flexible sealing ring integrally bonded to the actuator rod and compression sealed to the enclosure and providing for rotative movement of the actuator rod about an axis transverse to the rod at the intersection of its longitudinal axis and the plane of the sealing ring solely by flexing of the ring and without relative movement between surfaces connected to the actuator rod and sealing ring; a second sealing means about said actuator rod for sealing said entrance opening interiorly of said first sealing means, said second sealing means being independent of said first sealing means and of said rotative axis; a vent to atmosphere leading to said entrance opening between said sealing means; means for mounting said valve enclosure upon a fluid conduit with the actuator rod extending thereinto; and a paddle on the exterior end of said actuator rod, disposable in said conduit in the fluid flowing therethrough to be operated thereby.

References Cited by the Examiner

UNITED STATES PATENTS

| | | | |
|---|---|---|---|
| 1,340,513 | 5/1920 | Youngman | 236—48 |
| 1,404,898 | 1/1922 | Ryan | 236—48 |
| 1,875,511 | 9/1932 | Shivers | 251—65 |
| 2,129,937 | 9/1938 | Johnson | 236—48 |
| 2,310,504 | 2/1943 | Aubert | 200—81.9 |
| 2,532,210 | 11/1950 | Wasserlein | 74—18.1 |
| 2,842,150 | 7/1958 | Olson | 137—87 |
| 2,952,753 | 9/1960 | Kmiecik | 200—81.9 |
| 3,043,324 | 7/1962 | Morgan | 137—87 |

FOREIGN PATENTS 228,543 12/1925 Great Britain.

WILLIAM F. O'DEA, *Primary Examiner.*

ISADOR WEIL, R. GORDON, *Assistant Examiners.*

UNITED STATES PATENT OFFICE
CERTIFICATE OF CORRECTION

Patent No. 3,303,852　　　　　　　　　　　　　February 14, 1967

Avy L. Miller

It is hereby certified that error appears in the above numbered patent requiring correction and that the said Letters Patent should read as corrected below.

Column 5, line 42, strike out "with a substantially point contact" and insert the same after "arm" in line 43, same column 5.

Signed and sealed this 17th day of October 1967.

(SEAL)
Attest:

Edward M. Fletcher, Jr.

Attesting Officer

EDWARD J. BRENNER

Commissioner of Patents